Oct. 28, 1958　　W. K. SONNEMANN　　2,858,484
INDUCTION-TYPE ALTERNATING-CURRENT RELAYS
Filed Oct. 7, 1953　　　　　　　　　　　　　　2 Sheets-Sheet 1
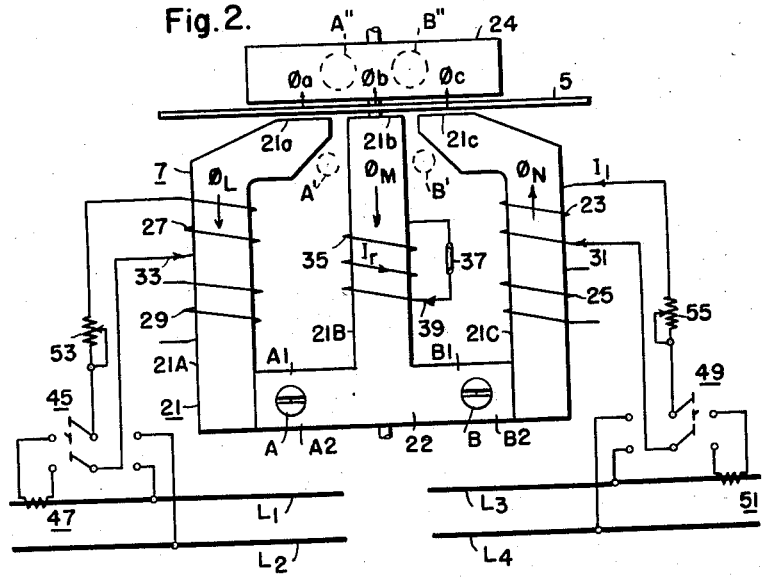
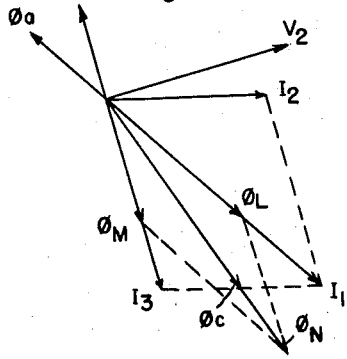
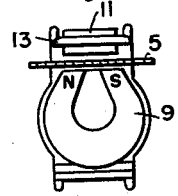
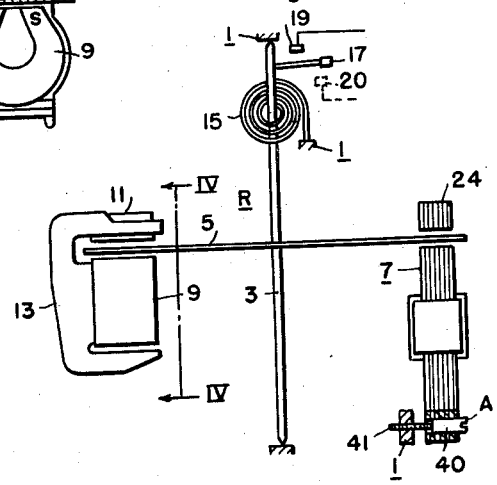
WITNESSES:
E. A. McCloskey
David M. Schiller
INVENTOR
William K. Sonnemann.
BY C. L. Freedman
ATTORNEY Oct. 28, 1958 W. K. SONNEMANN 2,858,484
INDUCTION-TYPE ALTERNATING-CURRENT RELAYS
Filed Oct. 7, 1953 2 Sheets-Sheet 2

United States Patent Office 2,858,484
Patented Oct. 28, 1958

2,858,484

INDUCTION-TYPE ALTERNATING-CURRENT RELAYS

William K. Sonnemann, Roselle Park, N. J., assignor to Westinghouse Electric Corporation, East Pittsburgh, Pa., a corporation of Pennsylvania Application October 7, 1953, Serial No. 384,699

14 Claims. (Cl. 317—123)

This invention relates to devices responsive to the differences between a plurality of alternating quantities, and it has particular relation to induction-type alternating-current relays which may be utilized either as balance or differential relays.

In accordance with the invention, a relay may be constructed with two or more windings suitable for energization by alternating quantities to provide a resultant alternating magnetic field. If two windings are employed, they may be separately energized in accordance with voltage and current of an alternating-current circuit to provide an impedance relay device. If desired, the windings may be energized in accordance with currents or voltages of alternating-current circuits to provide a balance or differential relay device. Furthermore, the relay may be provided with one or more adjustments for controlling the response of the relay. In a preferred embodiment of the invention, a substantially E-shaped electromagnet is provided which has three pole pieces magnetically connected and located in a common plane. A separate energizing winding surrounds each of the outer pole pieces, and a lagging winding surrounds the center pole piece. An electroconductive disc is mounted adjacent the pole faces of the three pole pieces for rotation under the influence of magnetic fluxes produced by energization of the energizing windings. The energizing windings are preferably provided with adjustments to provide adjustable magnetomotive forces when the windings are energized.

With such construction, rotation of the disc and resultant operation of the relay is effected only when the windings are energized to produce magnetomotive forces of unequal magnitudes and is independent of the phase relationship existing between the energizing quantities. The direction of rotation of the disc is dependent upon which of the windings produces the greater magnetomotive force. When the windings are energized to produce unequal magnetomotive forces, a resultant alternating magnetic flux is produced which is divided into three time-displaced magnetic flux components by means of the three pole pieces and the lagging winding to establish a shifting magnetic field for influencing the electroconductive disc to operate the relay. Independent adjustments are provided for the magnetic paths followed by two of the magnetic flux components for controlling the response of the relay. If desired, adjustable damping may be provided for the electroconductive armature of the relay.

It is, therefore, an object of the invention to provide an improved electroresponsive relay device.

It is still another object of the invention to provide an electroresponsive relay device including a magnetic structure presenting a plurality of paths for magnetic flux produced by energization of the magnetic structure in accordance with alternating quantities, said structure including means for deriving three time displaced magnetic flux components from magnetic flux flowing in said structure for influencing an electroconductive armature.

It is a further object of the invention to provide a relay as defined in the preceding paragraph wherein the magnetic reluctances of the paths followed by two of the flux components are independently adjustable.

It is a still further object of the invention to provide a relay as defined in the preceding paragraph wherein adjustable damping is provided for the electroconductive armature.

It is another object of the invention to provide an electroresponsive relay device having a response dependent upon the magnitudes of the energizing quantities and independent of the phase relationship existing between such energizing quantities.

Other objects of the invention will be apparent from the following description taken in conjunction with the accompanying drawings, in which:

Figure 1 is a view in side elevation with parts broken away and parts schematically shown of an electrical relay embodying the invention;

Fig. 2 is a view in rear elevation with parts schematically shown of an electromagnet suitable for the relay of Fig. 1;

Fig. 3 is a vector diagram showing the relationships of certain electrical quantities which may be present in the relay of Fig. 1;

Fig. 4 is a view taken along the line IV—IV of Fig. 1;

Figure 5:
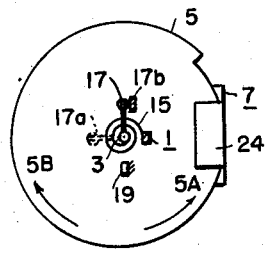
Fig. 5 is a view in top plan of an electroconductive armature suitable for use in the relay of Fig. 1.

Referring to the drawing, Fig. 1 shows a relay R designed for energization in accordance with variable alternating quantities. The relay includes a stator 1 by which a shaft 3 carrying an electroconductive armature 5 is mounted for rotation. Conveniently, the electroconductive armature 5 may be in the form of a disc constructed of aluminum or copper. An electromagnet 7 is provided for the purpose of establishing a shifting magnetic field within which a portion of the armature 5 is located. The shifting magnetic field influences the armature 5 to produce a torque which urges the armature in a predetermined direction about its axis.

For certain purposes adjustable damping may be provided for the armature 5. Conveniently, such damping is provided by means of a horseshoe-shaped permanent magnet 9 constructed of highly coercive permanent magnet material. The permanent magnet 9 has its two pole faces (identified in Fig. 4 by the reference characters N for north pole and S for south pole) positioned adjacent one face of the armature 5. A suitable plug 11 of soft magnetic material is positioned on the opposite side of the armature 5 to define with the pole faces two airgaps within which portions of the armature 5 are movable. The magnet 9 and the plug 11 may be secured to a suitable holder 13 of non-magnetic material, such as die-cast aluminum alloy. Preferably, the plug 11 is adjustable relative to the magnet 9 to change the effective length of the airgaps and, consequently, to change the strength of the magnetic fields therein. Conveniently, the plug 11 may have screw threads in threaded engagement with threads provided in the holder 13. By rotation of the plug 11, the plug may be moved towards or away from the associated magnet 9 to modify the strength of the magnetic fields influencing the armature 5. As is understood in the art, rotation of the armature 5 relative to the magnet 9 provides a damping force acting between the stator 1 to which the body or holder 13 is secured and the electroconductive armature 5.

For certain applications of the relay device R, a spiral control spring 15 may be provided having the inner end thereof secured to the shaft 3 and the outer end thereof secured to a portion of the stator 1. The spring 15 normally is in a plane substantially transverse to the shaft 3 but is shown rotated from its normal position in Fig. 1 to illustrate the convolutions thereof. The spring is shown as occupying its normal position in Fig. 5.

A movable contact 17 is secured to the shaft 3 for movement towards and away from a fixed contact 19 which may be secured to the stator 1. When the relay is de-energized, or when zero resultant electrical torque is applied to the armature 5, the spring 15 biases the movable contact 17 away from the fixed contact 19. When the electromagnet 7 is energized to effect rotation of the armature 5 in the direction indicated by the arrow 5A, as shown in Fig. 5, the movable contact 17 is moved against the bias of the spring 15 into engagement with the fixed contact 19 to complete an electrical circuit. If it be assumed that the relay has an additional fixed contact 20 and that the spring 15 urges the movable contact 17 to a position intermediate the fixed contacts 19 and 20 when the relay is deenergized or when zero resultant electrical torque is applied to the armature 5, then energization of the electromagnet 7 to effect rotation of the armature 5 in the direction indicated by the arrow 5B operates to urge the contact 17 into engagement with the fixed contact 20 to complete an additional electrical circuit. Such circuit completions may be employed for any desired purpose. For present purposes, it will be assumed that the relay R is provided with a single fixed contact 19 and is energized to urge the contact 17 towards or away from the contact 19.

The time required for the movable contact 17 to engage the fixed contact 19 depends on the torque developed by the electromagnet 7 acting on the armature 5 and on the magnitude of the damping applied to the armature 5 by the damping magnet assembly. The time also may be varied by adjusting the position of the movable contact 17 about the shaft 3. Thus in Fig. 5, the movable contact 17 is illustrated as displaced by an angle of 180° about the shaft 3 from the fixed contact 19. If the movable contact 17 is adjusted about the axis of the shaft 3 to the position illustrated in dotted lines 17A, the time required for movement of the contact 17 into engagement with the contact 19 is materially decreased. Such adjustment of the movable contact is well understood in the art. If desired, the movable contact, the shaft and the disc may be adjustable as a unit about the axis of the shaft 3 by means of a stop 17b to place the movable contact in any desired starting position. Operation of the stop changes the tension in the spring 15 when the parts are in their deenergized position.

As the movable contact 17 moves towards the fixed contact 19, the biasing torque exerted on the shaft 3 by the spring 15 increases. In order to compensate for such increase, the disc 5 may be provided with a spiral periphery, as is clearly shown in Fig. 5. By inspection of Fig. 5, it is observed that as the movable contact 17 rotates towards the fixed contact 19, the radius of the disc 5 at the electromagnet 7 increases. Such increase in the radius of the disc 5 operates to increase the torque exerted on the shaft 3 by the electromagnet 7, and may be proportioned to compensate for the increase in bias exerted by the spring 15. This means that if the electromagnet 7 is energized by the minimum required amount to initiate movement of the disc 5 in the direction of the arrow 5A, the disc will continue in substantially uniform motion as long as the energization of the electromagnet 7 remains constant until the contact 17 engages the contact 19.

Referring now to Fig. 2, it will be observed that the electromagnet 7 includes a substantially E-shaped magnetic structure 21 having three pole pieces 21A, 21B and 21C disposed substantially in a common plane and magnetically connected by means of a yoke portion 22. Electromagnets having configurations of this nature are shown in my Patent 2,488,443 and in my copending patent applications Serial Nos. 251,234, now Patent No. 2,697,187, and 274,845, now Patent No. 2,752,539, filed, respectively, October 13, 1951 and March 5, 1952. The magnetic structure 21 may be constructed of a plurality of laminations of soft magnetic material, such as soft iron, each having a shape illustrated in Fig. 2. Alternatively, each of the laminations may be constructed of two or more parts with the parts associated by means of butt or interleaved joints which are well known in the art. The pole pieces 21A, 21B and 21C have pole faces 21a, 21b and 21c, respectively, which are disposed in a common plane which is transverse to the plane of the pole pieces 21A, 21B and 21C.

In order to decrease the magnetic reluctance offered to the flow of magnetic flux, a magnetic member 24 is spaced from the pole faces 21a, 21b and 21c to provide airgaps between the member 24 and the pole faces. The armature 5 passes through these airgaps. The member 24, like the structure 21, may be constructed of soft magnetic laminations each having a shape similar to that illustrated in Fig. 2.

Energization of the electromagnet 7 may be provided by a plurality of windings each surrounding an appropriate part of the magnetic structure 21. For example, four windings, such as the windings 23, 25, 27 and 29 may be provided with the windings 23 and 25 surrounding the pole piece 21C and with the windings 27 and 29 surrounding the pole piece 21A. These windings may be connected for separate energization in accordance with any desired alternating quantities. For present purposes, it will be assumed that only the windings 23 and 27 are employed to effect energization of the magnetic structure 21.

Conveniently, the windings 23 and 27 may have an adjustable number of turns as represented by adjustable taps 31 and 33, respectively. The windings 23 and 27 may be connected for energization in accordance with any desired alternating quantities. For example, the relay device may be utilized as a differential relay with the windings 23 and 27 being connected for energization in accordance with two alternating quantities of the same nature, such as current or voltage. If it is desired to utilize the relay device as an impedance relay, the windings 23 and 27 are connected respectively for energization in accordance with current and voltage of an alternating-current circuit. Operation of the relay device will be more fully described hereinafter.

In order to establish a phase displacement between certain of the magnetic fluxes produced by energization of the windings 23 and 27, a closed lagging winding 35 surrounds the central pole piece 21B. Although the lagging winding may be a continuous and fixed closed winding, it will be assumed that the winding is closed through a switch 37 and that the number of turns in the winding is adjustable by means of an adjustable tap 39.

Assuming for the present that the winding 23 alone is energized in accordance with an alternating quantity, then a magnetomotive force is produced which directs magnetic flux components through parallel paths. One of the paths includes the pole piece 21C, a portion of the magnetic member 24, the airgaps between the member 24 and the pole faces 21b and 21c, and the pole piece 21B. The second path includes the pole piece 21C, portions of the magnetic member 24, the airgaps between the pole faces 21a and 21c, and the pole piece 21A. Magnetic flux components flowing in the pole pieces 21A, 21B and 21C are represented in Fig. 2 by arrows $\phi_L$, $\phi_M$, and $\phi_N$, respectively. The lagging winding 35 is effective to produce a substantial phase displacement between the magnetic flux components $\phi_L$ and $\phi_M$. Inasmuch as the magnetic flux component $\phi_N$ represents the vector sum of the flux components $\phi_L$ and $\phi_M$, it will be understood that the three magnetic flux components may be phase displaced from one another as a result of the lagging winding 35.

A portion of the magnetic flux component $\phi_N$ crosses the airgap between the member 24 and the pole face 21c, and may be represented in Fig. 2 by an arrow $\phi_c$. Another portion of the magnetic flux component $\phi_N$ flows directly between the pole pieces 21C and 21B without entering the electroconductive disc 5. In an analogous manner, a part of the flux component $\phi_M$ flows through the magnetic member 24 and is represented in Fig. 2 by an arrow $\phi_b$. Leakage flux also passes between the pole pieces 21B and 21A. Similarly, magnetic flux which flows between the member 24 and the pole piece 21A is represented in Fig. 2 by an arrow $\phi_a$. The arrows $\phi_a$ and $\phi_b$ are shown as being 180° out of phase with the arrows $\phi_L$ and $\phi_M$.

When the lagging winding 35 is closed through the switch 37, the magnetic flux components traversing the electroconductive disc 5 reach maximum values in the same relative directions through the airgaps in the order $\phi_a$, $\phi_b$ and $\phi_c$. This has the effect of producing a shifting magnetic field and applies a torque between the electromagnet 7 and the disc 5 which urges the armature 5 from left to right, as viewed in Fig. 2. This may be explained as follows.

It will be observed by reference to Fig. 3 that certain vector relationships exist in the relay of Fig. 1. The windings 23 and 35, together with associated parts of the magnetic structure, correspond somewhat to a transformer having a short-circuited secondary winding. Let it be assumed that a current represented by a vector $I_2$ flows in the winding 35, as indicated in Fig. 2. The current $I_2$ flows by reason of an induced voltage $V_2$ which is induced in the winding 35 by means of the flux component $\phi_M$. As seen in Fig. 3, the current $I_2$ is illustrated as slightly lagging the voltage $V_2$ by reason of the inductance of the winding 35. In order to induce the voltage $V_2$, a flux $\phi_M$ is required, and this is shown lagging the voltage $V_2$ by 90°. The amount of current in the winding 23 required to produce a flux $\phi_M$ is represented in Fig. 3, by the vector $I_3$. Inasmuch as the magnetic core for the windings 23 and 35 has substantial airgaps therein, it will be assumed that the current $I_3$ is in phase with the magnetic flux $\phi_M$. The vector sum of the currents $I_3$ and $I_2$ represents the current $I_1$ which flows in the winding 23. The magnetomotive force produced by the current $I_1$ flowing through the winding 23 also produces a flux $\phi_L$ which flows through the pole piece 21A. The vector sum of the magnetic fluxes $\phi_M$ and $\phi_L$ represents the magnetic flux $\phi_N$ flowing in the pole piece 21C.

As previously pointed out, part of the magnetic $\phi_N$ does not pass through the magnetic member 24. Consequently, the portion $\phi_c$ which passes through the member 24 is illustrated in Fig. 3 with a somewhat smaller magnitude. For the assumed conditions, the vectors $\phi_a$ and $\phi_b$ are shown 180° displaced, respectively, from the fluxes $\phi_L$ and $\phi_M$, and somewhat smaller in magnitude. From a consideration of Fig. 3, it will be noted that the phase order of the airgap magnetic fluxes is $\phi_a$, $\phi_b$ and $\phi_c$. This produces a shifting magnetic field and effects rotation of the electroconductive armature 5 in the direction from left to right, as viewed in Fig. 2. By a similar analysis, it may be shown that energization of the winding 27 alone, in accordance with an alternating quantity, effects rotation of the disc 5 in the direction from right to left, as viewed in Fig. 2. It has been found that the direction of rotation of the disc 5 for simultaneous energization of the windings 23 and 27 is solely dependent upon which of the windings produces the greater magnetomotive force, and is entirely independent of the phase relationship between the energizing quantities.

The switch 37 of the lagging winding 35 may represent the contacts of a directional relay. If power flows in one direction in the associated electrical circuit, the switch 37 is closed to permit effective energization of the electromagnet 7. If the power flow is in the reverse direction, the switch 37 is opened to prevent operation of the relay device. It will be assumed for present purposes that no directional relay is employed and that the switch 37 is continuously closed as shown in Fig. 2.

In order to control the response of the relay device, at least one of the two magnetic paths offered to the resultant magnetic flux produced by simultaneous energization of the windings 23 and 27 is adjustable. Preferably, both of the paths are independently adjustable. This may be effected by provision of one or more adjustable magnetic elements for each of the paths. Thus, in Fig. 2, magnetic elements may be located in the positions represented by the reference characters A, B, A', B', A" and B". The magnetic elements may take the form of plugs which are screw operated. For example in Fig. 1, the plug A has a large magnetic head 40 with a stud 41 projecting from one end thereof. The stud 41 is in threaded engagement with a portion of the stator 1. The head 40 is preferably constructed of soft magnetic material, such as soft iron or steel, and may be located within an opening provided in the electromagnet 7 and slidable through the opening in response to rotation of the plug. If desired, the head 40 may be spaced from the walls of the opening by a thin walled non-magnetic sleeve. For example, a thin plating of non-magnetic material, such as copper, may be applied to the head 40 for this purpose.

It will be noted that each of the plugs, for example the plug B, varies the series magnetic reluctance of the magnetic path with which it is associated. The portion of the magnetic structure adjacent the plug B carries the entire magnetic flux $\phi_N$. The magnetic member 24 adjacent the position B" carries only a portion of the magnetic flux represented by the vector $\phi_N$. It will be recalled that a portion of this magnetic flux flows directly between the pole pieces 21B and 21C without entering the magnetic member 24. Consequently, the magnetic plug in the position B" is effective only for the portion of the magnetic flux component represented by the vector $\phi_c$.

If the magnetic plug is in the position represented by the reference character B', it controls the amount of magnetic flux shunted away from the electroconductive armature 5. Some magnetic flux passes between the tips of the pole pieces 21B and 21C which are relatively closely spaced, as shown in Fig. 2. The magnetic plug in the position B' adjustably bridges the airgap between the tips to increase the amount of flux shunted away from the disc 5. Similar comments apply to the positions A, A' and A" for plugs associated with the remaining magnetic path.

In a preferred embodiment of the invention, the plugs A and B are employed only in the positions shown in full lines in Fig. 2. It will be understood that the openings provided in the magnetic section 22 to receive the plugs A and B leave bridges A1, A2 and B1 and B2, which saturate for low values of magnetic flux therethrough. When the plugs A and B are introduced into their associated openings, they shunt magnetic flux around the associated bridge portions and thereby alter the magnetic reluctances of the paths which contain the plugs.

Rotation of the plugs is, therefore, effective to vary the magnitudes of the magnetic flux components traversing the airgaps between the magnetic member 24 and the pole pieces 21A, 21B and 21C. The plugs A and B may be rotated in any desired manner. For example, rotation of the plugs may be effected either manually or by means of a suitable tool, such as a screw driver.

The relay is shown in Fig. 2 as being associated with conductors $L_1$, $L_2$, $L_3$ and $L_4$. For purposes of the invention, the conductors $L_1$ and $L_2$ may represent two conductors of a first single phase circuit or two conductors of a first polyphase circuit, and the conductors $L_3$ and $L_4$ may represent two conductors of a second single phase circuit or two conductors of a second polyphase circuit. Conductors $L_1$, $L_2$, $L_3$ and $L_4$ may also represent the conductors of a single circuit. For example, the conductors $L_1$ and $L_3$ may be parts of a common conductor and the conductors $L_2$ and $L_4$ may be parts of a common conductor to provide two conductors of a single phase circuit or two conductors of a polyphase circuit. A switch 45 may be associated with the winding 27 for the purpose of connecting the winding 27 either for energization in accordance with current of the conductor $L_1$ through a current transformer 47, or for energization in accordance with voltage between conductors $L_1$ and $L_2$. In a similar manner, a switch 49 may be associated with the winding 23 to connect the winding either for energization in accordance with current of conductor $L_3$ through a current transformer 51, or for energization in accordance with voltage between conductors $L_3$ and $L_4$.

Various applications of the relay device may now be described. If it is desired to employ the relay as a differential relay, the windings 23 and 27 may be connected for energization in accordance with two alternating quantities of the same nature, such as current or voltage. For present purposes, it will be asumed that the conductors $L_1$ and $L_2$ represent two conductors of a first single phase circuit, and that the conductors $L_3$ and $L_4$ represent two conductors of a second single phase circuit, with both circuits operating at a frequency of sixty cycles per second. It will be further assumed that switches 45 and 49 are positioned to connect respectively the windings 27 and 23 for energization in accordance with current of the conductors $L_1$ and $L_3$.

In order to prevent operation of the relay as long as the magnitudes of the currents traversing condutcors $L_1$ and $L_3$ maintain a predetermined relationship, the taps 31 and 33 may be adjusted to cause the windings 23 and 27 to produce substantially equal magnetomotive forces. With this arrangement substantially zero, resultant torque is applied to the disc 5 by the electromagnet 7 and the disc will not rotate. This may be explained by considering the paths followed by magnetic flux produced by energization of the windings 23 and 27. If it be assumed that the windings 23 and 27 are poled to produce when energized equal magnetomotive forces acting in opposition, then magnetic fluxes produced thereby follow symmetrical paths with the result that zero torque is produced to act on the disc 5. If on the other hand, it be assumed that the windings 23 and 27 are poled to produce when energized equal magnetomotive forces acting in cumulative relation, then magnetic fluxes produced thereby traverse the outer pole pieces without passing through the central pole piece 21B with the same result that no torque is produced between the electromagnet 7 and the disc 5.

It may be shown that operation of the relay is entirely independent of the phase relationship existing between the current to be compared. For example, if it be assumed that the two currents are displaced in phase by 180°, then the magnetomotive forces produced thereby are either in opposing or aiding relation depending upon the connections of the windings 23 and 27. Consequently, if the magnetomotive forces are of equal magnitude, zero torque is produced on the disc as explained above. For phase displacements of the currents other than 180°, the disc 5 tends to rotate first in one direction and then in the opposite direction from the stationary position with the result that the relay does not operate as long as the magnetomotive forces remain equal in magnitude.

If two fixed contacts 19 and 20 are provided and the spring 15 urges the movable contact 17 to a position intermediate the fixed contacts when zero resultant torque is produced between the electromagnet 7 and the disc 5, the contact 17 will remain out of engagement with the contacts 19 and 20 and the relay will not operate as long as the magnetomotive forces produced by energization of windings 23 and 27 remain substantially equal. However, if for any reason, such as a fault condition of one of the two circuits, the magnitudes of the currents therein deviate from their normal relationship, then the magnetomotive forces produced by the windings 23 and 27 become unbalanced to produce a resultant alternating magnetic flux which is divided into three time-displaced magnetic flux components effective to produce rotation of the armature 5.

As previously described, the direction of rotation of the armature is dependent upon which of the windings 23 and 27 when energized produces the greater magnetomotive force. Consequently, by means of the relay device it is possible to determine which of two circuits is experiencing a change in normal current. For example, if the winding 23 is connected for energization in accordance with current of conductor $L_1$ which has suddenly increased in value, the balance normally existing between magnetomotive forces of the windings 23 and 27 is disturbed with the winding 23 producing a greater magnetomotive force than the winding 27 to thereby effect rotation of the armature in the direction from left to right as viewed in Fig. 2.

It is to be noted that the relay may be employed to compare voltages as well as currents of two alternating-current circuits. For voltage energization, the relay is preferably provided with adjustable current limiting resistors 53 and 55 disposed in series circuit relation with respect to the windings 27 and 23 respectively. By adjusting the resistors 53 and 55, and the taps 31 and 33, the relay may be conditioned for response to deviation of voltages and currents from various relationships existing between such voltages and currents. For voltage comparison purposes, the windings 27 and 23 may have a relatively large number of turns of small gauge conductor compared to the number and gauge employed for current comparison.

Figure 6:
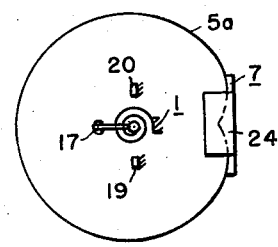
Fig. 6 is a view similar to Fig. 5 showing a different construction of the armature of Fig. 5.

If it is desired to utilize the relay R as a differential relay, and to provide compensation for torque produced by the spring 15, the disc 5 conveniently may be replaced by a disc of different configuration, such as the disc 5a of Fig. 6. As there shown, the disc 5a is of substantially heart-shaped configuration and is positioned when the relay is deenergized, or when zero resultant electrical torque is applied to the disc with the portion of minimum radius centrally located relative to the electromagnet 7. Regardless of the direction of rotation of the disc 5a, an increasing effective portion thereof is presented to the electromagnet for providing the desired compensation.

The relay R also may be connected to an alternating-current circuit for operation as an impedance relay device having an operating time dependent upon the distance between the relay location and the location of a fault condition of the circuit. For present purposes, it will be assumed that the conductors $L_1$ and $L_3$ are joined together and that the conductors $L_2$ and $L_4$ are joined together to provide two conductors of a single phase circuit operating at a frequency of 60 cycles per second. The conductors $L_1$, $L_2$, $L_3$ and $L_4$ may also represent two phase conductors of a polyphase circuit operating at a frequency of 60 cycles per second.

In order to provide an impedance relay device, windings 23 and 27 of the relay R are connected respectively by means of the switches 49 and 45 for energization in accordance with current and voltage of the single phase circuit. A single fixed contact, such as the contact 19 of Fig. 5, is disposed for engagement with the movable contact 17 upon predetermined rotation of disc 5 in the direction represented by the arrow 5A for completing an electrical circuit. Such circuit completion may be employed for any desired purpose. For example, suitable circuit interrupting means (not shown) may be operated upon such circuit completion to disconnect apparatus associated with the single phase circuit.

For normal operation of the single phase circuit, the magnetomotive forces produced by energization of windings 23 and 27 may be made substantially equal by proper adjustment of the taps 31 and 33 and the resistor 53 to position the contact 17 intermediate the contact 19 and the stop 17b.

When a fault condition of the circuit occurs, the operating time of the relay is dependent upon the distance between the point of connection of the relay and the location of the fault. This is explained by considering the fact that at a point relatively close to the location of the fault voltage decreases considerably from the normal value thereof, whereas voltage decreases only slightly from the normal value thereof at a point remote from the fault location. Consequently, assuming that a fault condition of the circuit occurs, and that the relay is connected in the manner described at a point relatively close to the fault, then the magnetomotive force produced by energization of the winding 23 becomes considerably greater than magnetomotive force produced by energization of the winding 27. This is effective to cause rotation of the disc 5 at a relatively high speed with the result that contact 17 engages contact 19 in a relatively short period of time. However, if the relay is connected at a point remote from the fault, the magnetomotive force produced by the winding 23 is only slightly greater than the magnetomotive force produced by winding 27 with the result that the disc 5 is caused to rotate at a comparatively low rate of speed.

Figure 7:
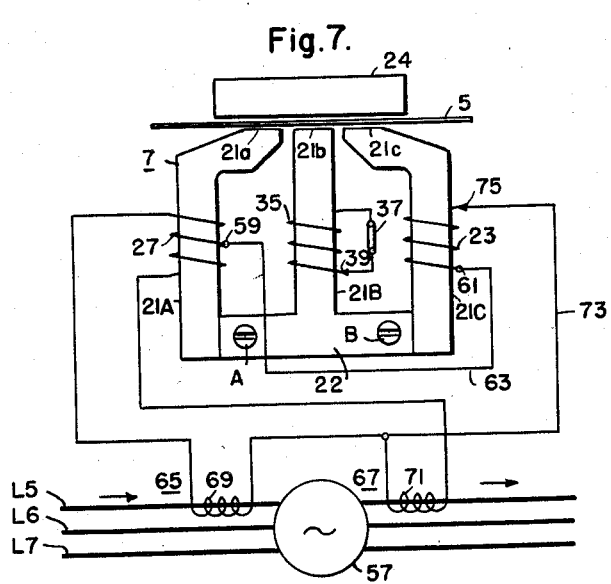
Fig. 7 is a view similar to Fig. 2 showing a different construction for parts thereof.

For certain purposes it may be desirable to provide a relay which is operable upon the occurrence of a predetermined differential between the magnitudes of two alternating quantities. Referring now to Fig. 7, there is shown a relay, such as the relay R of Figs. 1 and 2, connected for operation as a percentage differential relay. As there shown, the relay is associated with alternating current apparatus such as a generator 57. For present purposes, it will be assumed that the generator 57 is a three-phase generator having phase conductors $L_5$, $L_6$ and $L_7$. Instantaneous directions of flow of currents entering and leaving the generator 57 through conductor $L_5$ may be represented by arrows associated with such conductor.

In order to provide a relay which operates when the difference between the magnitudes of the currents entering and leaving the generator through phase conductor $L_5$ exceeds a certain percentage of the smaller of such currents, the winding 27 is connected for energization in accordance with the sum of such currents to produce a restraining torque acting between the disc 5 and the electromagnet 7, and the winding 23 is connected for energization in accordance with the difference between such currents to produce an operating torque acting between the disc 5 and the electromagnet 7. To this end, the winding 27 is provided with a center tap 59 to which the terminal 61 of the winding 23 is connected through a conductor 63. The winding 27 is connected for energization in accordance with the currents entering and leaving the generator 57 through a pair of current transformers 65 and 67 associated with the phase conductor $L_5$. The transformers preferably have substantially identical operating characteristics and have secondary windings 69 and 71 which are connected in series with the winding 27. The secondary windings are poled with respect to each other for directing currents carried thereby in the same direction through the winding 27. A conductor 73 connects the winding 23 and one terminal of the secondary windings 71 for providing a return path for current flowing in the winding 23. With such construction, the winding 23 is connected for energization by a current which varies in accordance with the difference between the magnitudes of the currents entering and leaving the generator through phase conductor $L_5$.

In order to permit operation of the relay over a substantial range of percentage differentials, the number of turns of the winding 23 is adjustable by means of an adjustable tap 75. By proper selection of the number of turns of the windings 23 and 27, the magnetomotive forces produced thereby may be made substantially equal when the difference between the currents equals a predetermined percentage of the smaller current as determined by the position of the tap 75. Consequently, when the difference between the currents exceeds such percentage, the magnetomotive forces become unbalanced with the magnetomotive force produced by energization of the winding 23 being greater than the magnetomotive force produced by energization of the winding 27 to urge the disc 5 in the direction represented by the arrow 5A of Fig. 5.

In order to produce a response upon predetermined rotation of the disc 5, a suitable contact, such as the contact 19 of Fig. 5, may be disposed for engagement with the movable contact 17 for establishing an electrical circuit. Such circuit completion may be employed for any desired purpose, such as for operating circuit interrupting means to disconnect the generator 57 from associated circuits.

By effecting adustment of the magnetic plugs A and B, the relay device may be provided with certain desired time curves for any of the described applications of the relay. Such adjustment of the plugs is effective to vary the magnitudes of alternating magnetic flux components traversing the airgaps defined by the member 24 and the pole pieces 21A, 21B and 21C. The time of operation of the relay may also be controlled by adjusting the plug 11 relative to the magnet 9 to vary the damping effect, and by adjusting the taps 31 and 33. For voltage energization of the windings 23 and 27, resistors 53 and 55 may be adjusted to control the operating time of the relay.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In an electroresponsive relay device responsive to alternating quantities, a magnetic structure, winding means for the magnetic structure effective when energized for establishing first and second magnetomotive forces representative of first and second energizing alternating quantities, means including said magnetic structure for deriving from magnetic flux produced by said magnetomotive forces three time-displaced magnetic flux components, said magnetic structure being effective to direct at least part of each of the magnetic flux components to an area for producing a shifting magnetic field in the area, said means being arranged such that said field shifts in either of two directions dependent upon the relative magnitudes of said magnetomotive forces, and translating means responsive to said shifting magnetic field.

2. In an electroresponsive relay device responsive to alternating quantities, a magnetic structure, winding means for the magnetic structure effective when energized for establishing first and second magnetomotive forces varying in accordance with first and second energizing alternating quantities, means including said magnetic structure for deriving from magnetic flux produced by said magnetomotive forces three time-displaced magnetic flux components, said magnetic structure being effective to direct at least part of each of the flux components to an area for producing a shifting magnetic fiield in the area, said means being arranged such that said field shifts in either of two directions dependent upon the relative magnitudes of said magnetomotive forces, translating means disposed in the area for movement under the influence of said shifting magnetic field, circuit controlling means responsive to predetermined movement of the translating means, and adjustable means for independently adjusting the magnitudes of said magnetomotive forces.

3. In an induction time delay relay device responsive to alternating quantities, a magnetic structure having first, second and third pole pieces, first winding means surrounding the first pole piece for energization in accordance with a first alternating quantity, second winding means surrounding the third pole piece for energization in accordance with a second alternating quantity, said first winding means being effective when energized to direct magnetic flux in parallel through the second and third pole pieces, said second winding means being effective when energized to direct magnetic flux in parallel through the first and second pole pieces, a closed circuit lagging coil surrounding the second pole piece for altering the time phase of magnetic flux passing therethrough to provide a shifting magnetic field, and an electroconductive armature mounted for rotation about an axis relative to the magnetic structure under the influence of said shifting magnetic field.

4. In an induction time delay relay device responsive to alternating quantities, a magnetic structure including first, second and third pole pieces disposed substantially in a common first plane, said second pole piece being intermediate the first and third pole pieces, said pole pieces having pole faces disposed substantially in a common second plane transverse to said first plane, a magnetic member spaced from said pole faces to define an air-gap between the member and each of the pole faces, first and second windings surrounding said first and third pole pieces to produce when energized alternating magnetic fluxes, a closed-circuit lagging coil linked with magnetic flux traversing said second pole piece to produce a shifting magnetic field in said air-gap, and an electroconductive armature mounted for rotation about an axis relative to the magnetic structure, said armature having a portion spaced from the axis positioned for movement through the air gap.

5. In an induction time delay relay device responsive to alternating quantities, a magnetic structure, winding means for the magnetic structure for producing when energized a plurality of magnetomotive forces each representative of a separate energizing quantity, means including said magnetic structure for deriving from magnetic flux produced by said magnetomotive forces three time-displaced magnetic flux components, said magnetic structure being effective to direct at least part of each of said flux components to an area for producing a shifting magnetic field in said area, said means being arranged such that said field shifts in either of two directions dependent upon the relative magnitudes of said magnetomotive forces, an electroconductive disc mounted for rotation relative to the magnetic structure under the influence of said shifting magnetic field about an axis, said disc having a portion spaced from said axis positioned for movement through said area, and biasing means biasing the disc for rotation in one direction with a force which increases as the disc rotates in the other direction, said electroconductive disc having a spiral configuration presenting an increasing effective portion to said area as the disc rotates in said other direction.

6. In an electroresponsive relay device responsive to alternating quantities, a magnetic structure including first, second and third pole pieces disposed substantially in a common first plane, said second pole piece being intermediate the first and third pole pieces, said pole pieces having pole faces disposed substantially in a common second plane transverse to said first plane, a magnetic member spaced from said pole pieces to define an air-gap between the member and each of the pole faces, first and second windings surrounding said first and third pole pieces to produce when energized alternating magnetic fluxes, a closed-circuit lagging coil linked with magnetic flux traversing said second pole piece to produce a shifting magnetic field in said air-gap, an electroconductive disc mounted for rotation relative to the magnetic structure to first and second positions under the influence of said shifting magnetic field about an axis, said disc having a portion spaced from said axis positioned for movement through said air-gap, and biasing means urging said disc toward a third position intermediate said first and second positions.

7. In an elestroresponsive relay device responsive to alternating quantities, a magnetic structure having first, second and third pole pieces, a plurality of first windings surrounding the first pole piece, a plurality of second windings surrounding the third pole piece, each of said windings being suitable for energization in accordance with an alternating quantity, means including said magnetic structure for deriving from magnetic flux produced by energization of said windings three time-displaced magnetic flux components, said magnetic structure being effective to direct at least part of each of the magnetic flux components to an area for producing a shifting magnetic field in the area, said means being arranged such that said field shifts in either of two directions dependent upon the relative magnitudes of magnetomotive forces established in response to energization of said first and second windings, and translating means responsive to said shifting magnetic field.

8. In an induction time delay relay, a magnetic structure including first, second and third pole pieces disposed substantially in a common first plane, said second pole piece being intermediate the first and third pole pieces, said pole pieces having pole faces disposed substantially in a common second plane transverse to the first plane, a magnetic member spaced from the pole faces to define an air gap between the magnetic member and the pole faces, a first winding surrounding the first pole piece for energization in accordance with a first alternating quantity, a second winding surrounding the third pole piece for energization in accordance with a second alternating quantity, said first winding being effective when energized to establish a first magnetomotive force for directing magnetic flux in parallel through the second and third pole pieces, said second winding being effective when energized to establish a second magnetomotive force for directing magnetic flux in parallel through the first and second pole pieces, a closed circuit lagging coil surrounding the second pole piece to link magnetic flux traversing the second pole piece for producing a shifting magnetic field in the air gap, an electroconductive armature mounted for rotation about an axis relative to the magnetic structure under the influence of the shifting magnetic field, said armature having a portion spaced from the axis positioned for movement through the air gap, biasing means urging the armature for rotation in one direction with a force which increases as the armature rotates in the other direction, said armature having a spiral configuration presenting an increasing effective portion to the air gap as the armature rotates in said other direction, circuit controlling means responisve to predetermined rotation of the armature, adjustable damping means for damping rotation of the armature relative to the magnetic structure, first adjustable means for independently adjusting the magnetic reluctance of a plurality of paths followed by a magnetic flux produced by energization of the first and second windings, and second adjustable means for independently adjusting the magnitudes of said first and second magnetomotive forces.

9. In an induction time delay relay, a magnetic structure including first, second and third pole pieces disposed substantially in a common first plane, said second pole piece being intermediate the first and third pole pieces, said pole pieces having pole faces disposed substantially in a common second plane transverse to the first plane, a magnetic member spaced from the pole faces to define an air gap between the magnetic member and the pole faces, a first winding surrounding the first pole piece for energization in accordance with a first alternating quantity, a second winding surrounding the third pole piece for energization in accordance with a second alternating quantity, said first winding being effective when energized to establish a first magnetomotive force for directing magnetic flux in parallel through the second and third pole pieces, said second winding being effective when energized to establish a second magnetomotive force for directing magnetic flux in parallel through the first and second pole pieces, a closed circuit lagging coil surrounding the second pole piece to link magnetic flux traversing the second pole piece for producing a shifting magnetic field in the air gap, an electroconductive armature mounted for rotation about an axis relative to the magnetic structure to first and second positions under the influence of the shifting magnetic field, said armature having a portion spaced from the axis positioned for movement through the air gap, biasing means urging the armature for rotation toward a third position intermediate the first and second positions with a force which increases as the armature rotates toward either of the first and second positions, said armature having a substantially heart-shaped configuration presenting an increasing effective portion to the air gap as the armature rotates toward either of the first and second positions from the third position, first adjustable means for independently adjusting the magnetic reluctances of a plurality of paths followed by magnetic flux produced by energization of the first and second windings, and second adjustable means for independently adjusting the magnitudes of said first and second magnetomotive forces.

10. In an electroresponsive relay device responsive to alternating quantities, a magnetic structure, winding means for the magnetic structure effective when energized for establishing first and second magnetomotive forces representative of first and second energizing alternating quantities, means including said magnetic structure for deriving from magnetic flux produced by said magnetomotive forces three time-displaced magnetic flux components, said magnetic structure being effective to direct at least part of each of the magnetic flux components to an area for producing a shifting magnetic field in the area, said means being arranged such that said field shifts in either of two directions dependent upon the relative magnitudes of said magnetomotive forces, translating means responsive to said shifting magnetic field, and means for independently adjusting the magnetic reluctances of a plurality of the paths followed by said magnetic flux components.

11. In an induction time delay relay device responsive to alternating quantities, a magnetic structure having first, second and third pole pieces, first winding means surrounding the first pole piece for energization in accordance with a first alternating quantity, second winding means surrounding the third pole piece for energization in accordance with a second alternating quantity, said first winding means being effective when energized to direct magnetic flux in parallel through the second and third pole pieces, said second winding means being effective when energized to direct magnetic flux in parallel through the first and second pole pieces, a closed circuit lagging coil surrounding the second pole piece for altering the time phase of magnetic flux passing therethrough to provide a shifting magnetic field, an electroconductive armature mounted for rotation about an axis relative to the magnetic structure under the influence of said shifting magnetic field, and means for independently adjusting the magnetic reluctances of a plurality of the paths followed by magnetic flux produced by energization of said first and second winding means.

12. In an induction time delay relay device responsive to alternating quantities, a magnetic structure including first, second and third pole pieces disposed substantially in a common first plane, said second pole piece being intermediate the first and third pole pieces, said pole pieces having pole faces disposed substantially in a common second plane transverse to said first plane, a magnetic member spaced from said pole faces to define an air gap between the member and each of the pole faces, first and second windings surrounding said first and third pole pieces to produce when energized alternating magnetic fluxes, a closed-circuit lagging coil linked with magnetic flux traversing said second pole piece to produce a shifting magnetic field in said air gap, an electroconductive armature mounted for rotation about an axis relative to the magnetic structure, said armature having a portion spaced from the axis positioned for movement through the air gap, and adjusting means for independently adjusting the magnetic reluctances of a plurality of the paths followed by magnetic flux produced by energization of said first and second winding means.

13. In an induction time delay relay device responsive to alternating quantities, a magnetic structure, winding means for the magnetic structure for producing when energized a plurality of magnetomotive forces each representative of a separate energizing quantity, means including said magnetic structure for deriving from magnetic flux produced by said magnetomotive forces three time-displaced magnetic flux components, said magnetic structure being effective to direct at least part of each of said flux components to an area for producing a shifting magnetic field in said area, said means being arranged such that said field shifts in either of two directions dependent upon the relative magnitudes of said magnetomotive forces, an electroconductive disc mounted for rotation relative to the magnetic structure under the influence of said shifting magnetic field about an axis, said disc having a portion spaced from said axis positioned for movement through said area, biasing means biasing the disc for rotation in one direction with a force which increases as the disc rotates in the other direction, said electroconductive disc having a spiral configuration presenting an increasing effective portion to said area as the disc rotates in said other direction, and adjustable means for independently adjusting the magnetic reluctances of a plurality of paths followed by said magnetic flux components, said adjustable means comprising a separate magnetic element disposed in each of said magnetic paths, each of the magnetic elements being independently adjustable relative to the magnetic structure for varying the effective cross section of the associated magnetic path.

14. In an induction time delay relay device responsive to alternating quantities, a magnetic structure including first, second and third pole pieces disposed substantially in a common first plane, said second pole piece being intermediate the first and third pole pieces, said pole pieces having pole faces disposed substantially in a common second plane transverse to said first plane, a magnetic member spaced from said pole pieces to define an air gap between the member and each of the pole faces, first and second windings surrounding said first and third pole pieces to produce when energized alternating magnetic fluxes, a closed-circuit lagging coil linked with magnetic flux traversing said second pole piece to produce a shifting magnetic field in said air gap, an electroconductive disc mounted for rotation relative to the magnetic structure to first and second positions under the influence of said shifting magnetic field about an axis, said disc having a portion spaced from said axis positioned for movement through said air gap, and biasing means urging said disc toward a third position intermediate said first and second positions, said biasing means urging said disc toward said third position with a force which increases as the disc rotates from said third position toward either of said first and second positions, said disc having a substantially heart-shaped configuration presenting an increasing effective portion to said air gap as the disc rotates toward either of said first and second positions from said third position.

References Cited in the file of this patent

UNITED STATES PATENTS

| | | |
|---|---|---|
| 1,508,360 | Conwell | Sept. 9, 1924 |
| 2,094,986 | Journeaux | Oct. 5, 1937 |
| 2,488,443 | Sonnemann | Nov. 15, 1949 |
| 2,697,187 | Sonnemann | Dec. 14, 1954 |

FOREIGN PATENTS

| | | |
|---|---|---|
| 121,584 | Great Britain | Apr. 24, 1919 |
| 550,795 | France | Mar. 20, 1923 |
| 52,056 | Sweden | Aug. 30, 1933 |